Nov. 26, 1968

L. R. DE BELL 3,412,823

SEISMIC SURVEY INTERCONNECTION SYSTEM

Filed Aug. 7, 1967

INVENTOR.
LAWRENCE R. DE BELL

BY *Dunlap and Laney*

ATTORNEYS

Nov. 26, 1968    L. R. DE BELL    3,412,823
SEISMIC SURVEY INTERCONNECTION SYSTEM
Filed Aug. 7, 1967    3 Sheets-Sheet 2

INVENTOR.
LAWRENCE R. DE BELL
BY
Dunlap and Hanny
ATTORNEYS

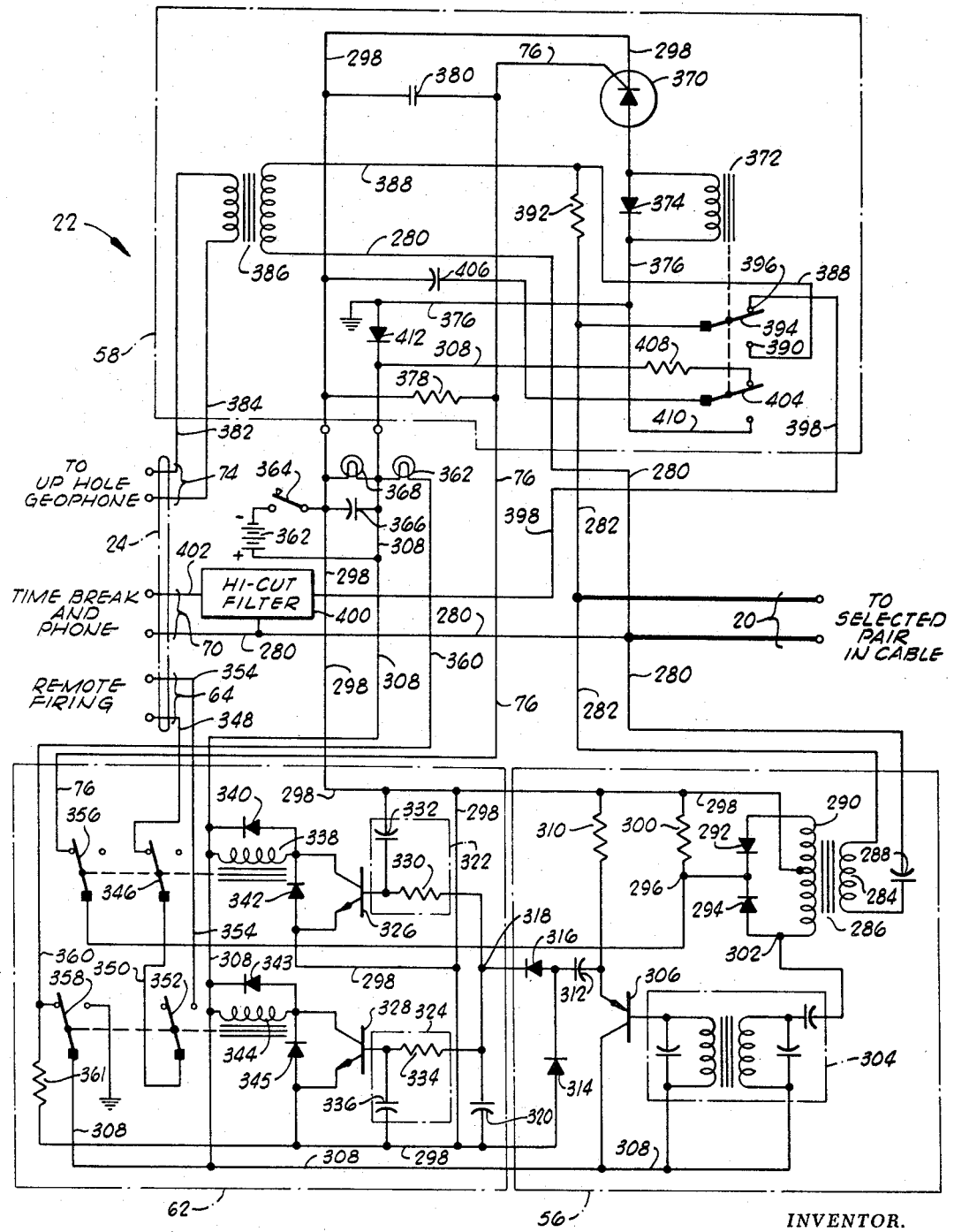

United States Patent Office 3,412,823
Patented Nov. 26, 1968

3,412,823
SEISMIC SURVEY INTERCONNECTION SYSTEM
Lawrence R. De Bell, Oklahoma City, Okla., assignor to Centronics Inc., Oklahoma City, Okla., a corporation of Oklahoma
Filed Aug. 7, 1967, Ser. No. 658,680
14 Claims. (Cl. 181—.5)

ABSTRACT OF THE DISCLOSURE

Apparatus for use in geophysical prospecting systems wherein a single wire pair is utilized for non-interfering transmission of voice communication, shot firing signal, time break information, and uphole information. A single wire pair is utilized to transmit a constant frequency control signal which serves to pre-condition the circuitry prior to shot firing, and voice communication between the energy source and field recording positions can also take place during this pre-shot period; the control signal is then varied to detonate or initiate seismic energy generation and, thereafter, the time break information and uphole information are transmitted successively in non-interfering relationship over the same wire pair.

BACKGROUND OF THE INVENTION

Field of the invention

The invention relates generally to seismic survey field equipment and, more particularly, but not by way of limitation, it relates to information transmission apparatus of a type which may be utilized in interconnecting the components of a prospecting system.

Description of the prior art

The prior art teaches various methods for transmitting certain classes or type of seismic data to a central recordstation or field recording position. Also, many of these methods teach ways of utilizing spare conductors which are present within the geophone cable. Still other previous disclosures describe data transmission by multiplexing of plural forms of data for transmission over a single channel telephone line. The variously transmitted seismic data or information signals may then be recorded on one or more traces at the central or data collecting station. Prior attempts to economize on transmission circuit requirements have usually met with problems due to the fact that certain components of seismic data, e.g. first break and uphold information, experience electrical interference due to cross-coupling and inherent induction characteristics along the geophone cable.

SUMMARY OF THE INVENTION

The present invention contemplates data transmission apparatus for communication of control signals and seismic data over long distances between the seismic energy shot and recording sites. In a more limited aspect, the invention utilizes a single two-wire pair of conductors selected out of a standard geophone cable for the delivery of all firing control and information synchronizing signals which must be transmitted between the shot and recording sites. Thus, a constant frequency control generator located at a recording site is employed to control the detonation or initiation of a seismic source at the shot site, the electrical signal being transmitted over a single pair of wires in the geophone cable. Upon initiation of the seismic source, time break information is returned over the twowire pair, the uphole signal source being muted, and after a brief delay the time break source is removed from the transmission circuit and the uphole signal source is connected thereto.

Therefore, it is an object of the present invention to provide more efficient and reliable interconnection of seismic prospecting auxiliary signals between the shot and recording sites.

It is also an object of the present invention to utilize a single spare pair of wires in a standard geophone cable for the purpose of transmitting remote blaster actuation, time break data signals, uphold data signals, and two-way voice communication between the shot and recording sites.

It is a further object of the invention to provide such two-way transmission of a plurality of seismic data and auxiliary signals such that they are transmitted over a single two-wire pair in non-interfering relationship.

Finally, it is an object of the present invention to provide apparatus for transmitting actual time break signals and actual uphole signals, as well as the remote firing initiation signals and voice communication, such that cable transmission is effected over a single two-wire pair without transients and interference between the data, and without cross-feed into other seismic data circuits of the geophone cable.

Other objects and advantages of the invention will be evident from the following detailed description when read in conjunction with the accompanying drawings which illustrate the invention.

BRIEF DESCRIPTION OF THE DRAWINGS

FIG. 4 is a schematic diagram of the electronic circuitry which comprises the shot adapter of FIG. 1.

DESCRIPTION OF PREFERRED EMBODIMENT

Figure 1:
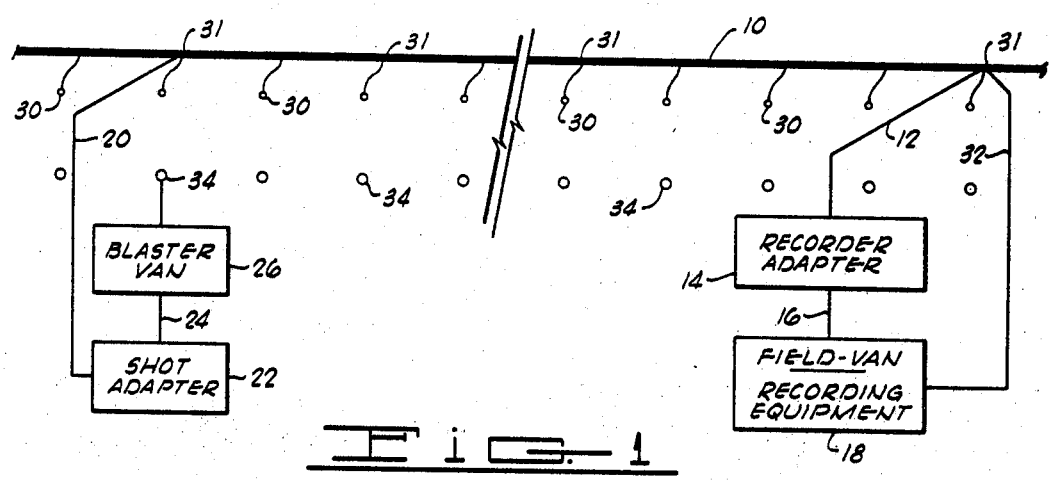
FIG. 1 is a pictorial block diagram of a geophysical prospecting system including the present invention.

FIG. 1 shows one form of geophysical prospecting system as it would utilize the present invention. A geophone cable 10 is connected by a cable 12 to a recorder adapter 14; and, in turn, the recorder adapter 14 is connected via a cable 16 to the field van 18 which includes the standard forms of seismic recording equipment. Similarly, a cable 20 is connected between the geophone cable 10 and shot adapter 22 which is further tied through cable 24 to the blaster van 26. Van 26 would house the equipment for controlling the seismic shot generation. It should be understood that the present invention is not particularly limited to the dynamite or one-shot forms of geophysical prospecting but that the present transmission control techniques are equally applicable to the vibrational types of seismic energy generation, detection and recording.

The geophone cable 10 is generally a very long cable, sometimes on the order of a mile or more, and a series of geophones 30 are connected at spaced intervals therealong. Each of the geophones 30 is connected through a standard access connector 31 to a separate two-wire pair of a plurality of pairs within geophone cable 10. Thus, received or reflected seismic energy detected in each one of the geophones 30 is transmitted on a separate twowire pair along geophone cable 10 and through the interconnecting cable 32 to the field van 18. The seismic information delivered via cable 32 is the multi-channel seismic data which constitutes the major substance of the geophysical sounding, this being the interpretative data.

A plurality of shot locations 34 are also located at spaced intervals. In the case of dynamite prospecting, the shot locations 34 are drilled holes which contain a dynamite charge and the blaster van 26 can move along to successive locations 34, detonating the respective dynamite charges, each series of received signals through geophones 30 being conducted along geophone cable 10 and through multi-channel linking cable 32 for recording in field van 18. Cables such as geophone cable 10 are available with any number of wire pairs contained therein, e.g., 25 two-wire pairs. In accordance with the invention, a single two-wire pair is all that is required for the various auxiliary seismic signals, i.e. remote fire, time break, uphole, and phone communications, and this wire pair of geophone cable 10 is connected by a suitable adaptive connector (not specifically shown) to the two-wire cables 12 and 20 leading to the recorder adapter 14 and shot adapter 22, respectively. As blaster van 26 progresses along initiating the various shots from the successive shot locations 34, the operator need only shift the two-wire cable 20 to the successive cable connectors 31 which is proximate the position of blaster van 26.

Figure 2:
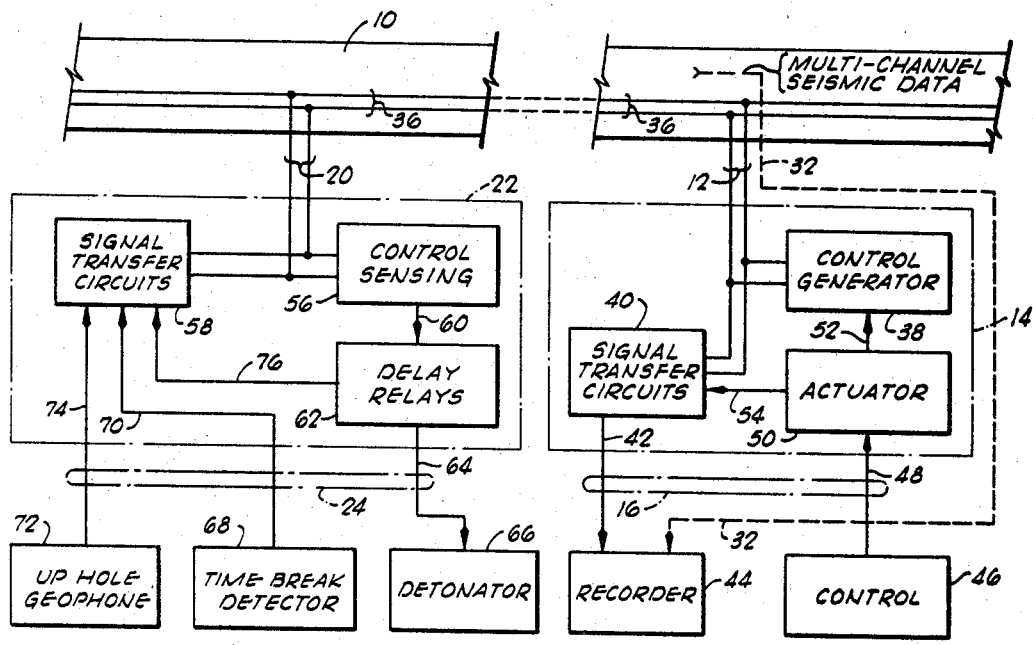
FIG. 2 is an enlarged block diagram showing the interconnection of adapter circuits at the shot site and the recording site.

FIG. 2 is a somewhat more detailed showing of the manner in which equipment at the shot and recording locations is interconnected by a single two-wire pair 36 selected from the multiple two-wire pairs contained within geophone cable 10 at the recording site, the two-wire pair 36 is connected via wire pair 12 to a control generator 38, which provides a constant frequency signal output, and also to the signal transfer circuit 40. Output from signal transfer circuits 40 is provided via lead 42 to a recorder 44 carried within field van 18 (FIG. 1). The multi-channel seismic data from geophone cable 10 is also conducted via multi-pairs cable 32 (dashed line) for input to recorder 44. Remote firing control can be effected from the control 46 which provides a suitable output on line 48 to an actuator 50. Actuator 50, a relay actuation circuit, as will be described, provides remote firing control output on lead 52 to control generator 38 as well as output on lead 54 which serves to condition the signal transfer circuits 40 to make the proper differentiation between incoming time break and uphole information signals.

At the shot location, the shot adapter 22 is connected into the system via the two-wire pair 20. Wire pair 20 connects the selected wire pair 36 of geophone cable 10 to each of a control sensing stage 56 and signal transfer circuits 58. The output of control sensing 56 provides a control output on lead 60 to delay relays 62 and this stage in turn provides output on line 64 of cable 24 to initiate the seismic energy generation, as by actuating a detonator 66. A time break detector 68 is connected via lead 70 to provide an input to signal transfer circuits 58. An uphole geophone 72 provides an output on line 74 to the signal transfer circuits 58. Signal transfer circuits 58 are further controlled by an input on lead 76 from delay relay 62 to pre-condition the signal transfer circuits 58 such that proper switching of time break and uphole information will be effected as will be further described.

The detonator 66 may be a standard form of detonation circuit as is well known in the art. In the event that seismic energy other than dynamite blast is employed, the detonator 66 would be replaced by the characteristic actuation or energy initiation control device. Similarly, the time break detector 68 may be a conventional form of device; for example, and in the case of dynamite detonation, the time break detector 68 may take the form of a transformer output device which conducts an amplified firing pulse from the point of detonation.

Figure 3:
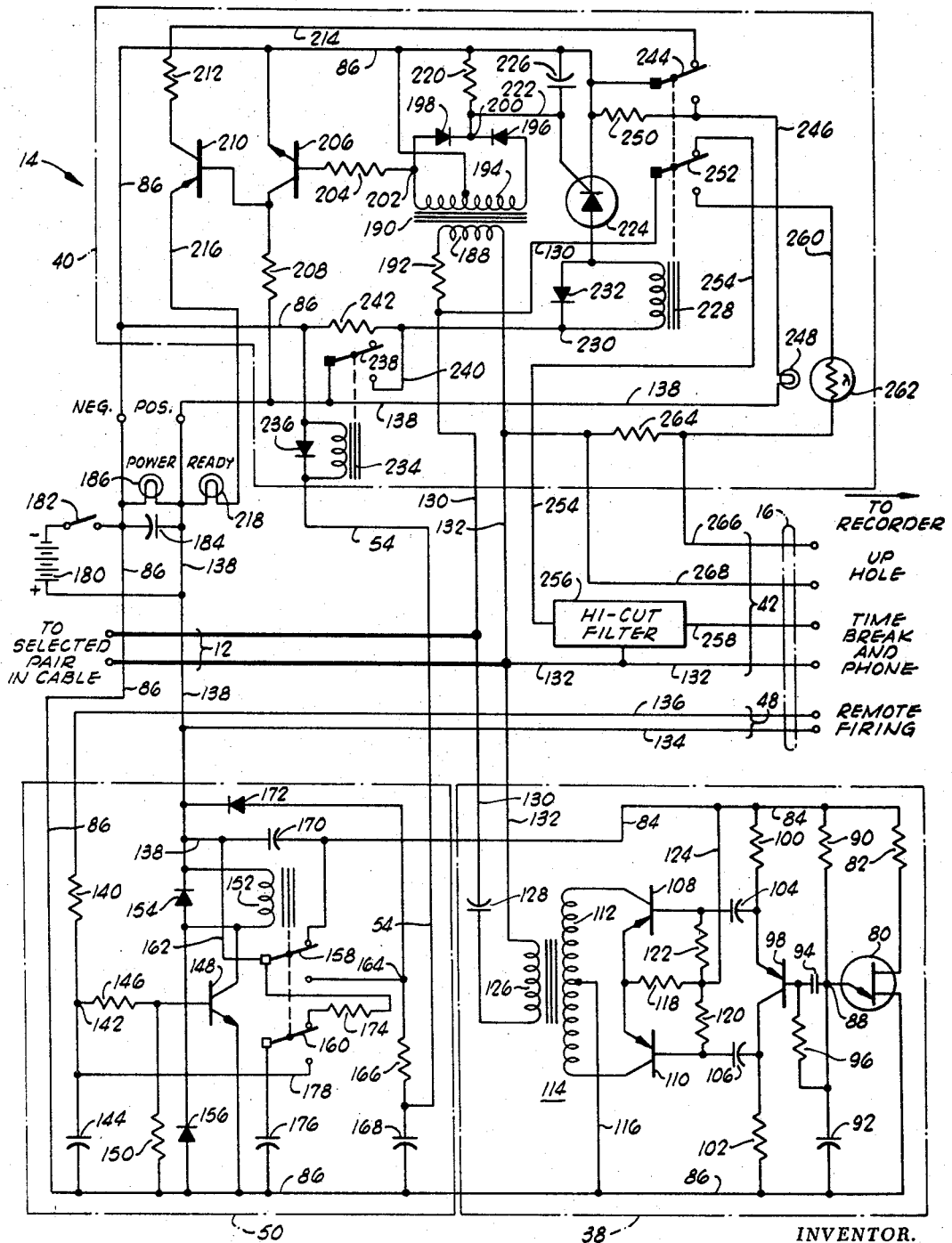
FIG. 3 is a schematic diagram of the electronic circuitry which comprises the recorder adapter of FIG. 1.

The recorder adapter 14 is shown in detailed schematic form in FIG. 3. The control generator 38 is a relaxation-type oscillator consisting of a uni-junction transistor 80 which oscillates at a constant frequency. The uni-junction transistor 80 is connected with base B2 connected through a resistor 82 to a positive supply lead 84 and its remaining base B1 is connected directly to the negative supply lead 86. The emitter is connected to an output junction 88 between resistor 90, connected to positive supply 84, and a capacitor 92, connected to negative supply 86.

Hence, the frequency of oscillation of control generator 38 is determined by the size of resistor 90 and capacitor 92 as capacitor 92 is repetitively charged through resistor 90 to fire the uni-junction transistor 80.

The oscillatory output at junction 88 is supplied through a capacitor 94, as bypassed by a resistor 96, to the base of a PNP-type transistor 98. Transistor 98 is emitter connected through a resistance 100 to the positive supply 84 with its collector connected through resistor 102 to the negative supply lead 86, and it provides phase inverted output from both its emitter and collector through respective capacitors 104 and 106 to the bases of each of PNP-type transistors 108 and 110. Transistors 108 and 110 are connected in conventional push-pull through center tapped winding 112 of a transformer 114, the center tap being connected via lead 116 to the negative supply lead 86. The emitters of transistors 108 and 110 are biased in a balanced relationship by means of a load resistor 118, bias resistors 120 and 122, and a lead 124 connected to positive supply lead 84. The oscillating output from transformer 114 is then present across output winding 126 as conducted through D-C blocking capacitor 128 via leads 130 and 132. The leads 130 and 132 are connected to respective leads of wire pair 12 which, in turn, are connected to the selected wire pair 36 in geophone cable 10 (FIG. 2).

The actuator 50 provides circuitry whereby a remote firing actuation in the form of a switch closure between leads 48 from control 46 (see FIG. 2) deactivates the control generator 38 to initiate seasmic energy generation in a manner to be further described. The control leads 48 consist of a pair of leads 134 and 136, lead 134 being connected to a positive voltage supply lead 138, and the remaining lead 136 being connected through a resistor 140 to an input junction 142 to actuator 50. Thus, the input junction 142 is connected through a capacitor 144 to the negative supply lead 86 as well as through a voltage dropping resistor 146 to the base of an NPN-type transistor 148. The base of transistor 148 is stabilized by connection through resistor 150 to the negative supply lead 86 while its emitter is connected directly to the negative lead 86. The collector is then connected for conduction through a relay 152 to the positive supply lead 138. A diode 154 is connected across the relay 152 to provide transient suppression, and a further clamping diode 156 is connected in series between realy 152 and the negative supply lead 86.

The relay 152 actuates a pair of movable contacts 158 and 160. Thus, movable contact 158 is connected via lead 162 to the positive supply lead 138 and provides positive D-C potential to supply lead 84 when de-energized. When energized, the positive supply lead 84 (to control generator 38) is disconnected and the positive supply voltage on lead 162 is applied to a junction 164 through a small resistance 166 to charge up a capacitor 168, the charging voltage output being present on lead 54 to signal transfer circuits 40, as will be further described. A capacitor 170 is connected between positive supply leads 138 and 84 and is bypassed by relay contact 158 to energize control generator 38, and a diode 172 connected from positive lead 138 to junction 164 provides transient suppression upon actuation of movable contact 158 of relay 152.

Another movable contact 160 is connected in its normal position through a resistor 174 via lead 162 to the positive voltage supply on lead 138 such that a capacitor 176 is brought to and maintained in charged condition. Upon actuation of relay 152, the charged capacitor 176, being of relatively high value, is connected to lead 178 which ties back to the junction 142 at the input to transistor 148. Thus, upon remote firing actuation, when transistor 148 is biased in conduction, the relay 152 and its contact 160 serve to switch in the additional capacitive charge from capacitor 176 to maintain transistor 148 in conduction for a predetermined extended period which need only be long enough to allow the completion of shot firing and transmission of the synchronizing data signals.

The recorder adapter 14 is energized by a battery 180, for example a conventional twelve volt power pack, and a main power switch 182 serves to place the energizing power between positive supply lead 138 and the negative supply lead 86. A capacitor 184, having a very high value of capacitance, is connected across the power source as is a lamp 186 which is illuminated to indicate the "Power On" condition. It should be understood that any available form of primary power may be employed as from batteries, line source or whatever.

The signal transfer circuits 40 receive an input on leads 130 and 132 which are connected to the lead-in wire pair 12 from geophone cable 10 (FIG. 2). Leads 130 and 132 are connected to an input winding 188 of transformer 190, a resistor 192 being connected in series, and a secondary winding 194 is center tap-connected to the negative supply lead 86. Each side of secondary 194 is connected in forward direction through diodes 196 and 198 which are connected at a junction 200. An additional output from transformer secondary 194 is connected from a junction 202 through a resistor 204 for input to the base of an NPN-type transistor 206. The emitter of transistor 206 is connected directly to the negative supply lead 86 and the collector is connected through a load resistor 208 to the positive supply lead 138. A collector output from transistor 206 is then applied to the base of a PNP-type transistor 210 which serves to indicate equipment "Ready" upon conduction. Thus, its collector is connected through a load resistor 212 to a negative voltage supply lead 214 (to be further described) and its emitter is connected directly to a lead 216 through a "Ready" lamp 218 to the positive supply lead 138.

The previously mentioned output junction 200 in the transformer secondary 194 circuit is biased from the negative voltage lead 86 by a resistor 220 and it provides an output on a lead 222 to the gate electrode of an SCR 224. A gate control capacitor 226 is connected between the gate electrode and negative supply lead 86, and negative lead 86 is connected directly to the cathodes of SCR 224. The anode of SCR 224 is connected through a relay 228 to a junction 230 which is periodically positively energized (as will be described) to enable the firing of SCR 224 and, thus, the activation of relay 228. A transient suppression diode 232 is connected across the coil of relay 228.

The positive voltage junction 230 is periodically energized by actuation of a relay 234. Thus, as previously stated, the charging of capacitor 168 in actuator 50 provides an output voltage on lead 54 through the relay 234, as bypassed by suppressor diode 236, to the negative supply lead 86 to energize the relay 234 such that positive supply voltage on lead 138 is conducted through movable element 238 and lead 240 to provide energizing potential at junction 230. A resistor 242 provides loading of the extinguished SCR circuit when relay 234 is not activated.

The effect of relay 228 is to transfer the signal conduction capabilities, that is, to disable time break conduction and enable uphole signal delivery upon energization. Thus, a movable element 244 provides negative energization from negative supply lead 86 to negative supply lead 214 and transistor 210 during the relay deactivated condition and, when activated, the negative supply lead 86 is connected to a lead 246 and through a muting lamp 248 to the positive supply lead 138. A small resistance 250 is interposed between negative supply lead 86 and lead 246 such that the muting lamp 248 will still be partially illuminated during deactivation of relay 228.

A movable contact 252 is connected to a lead 254 when relay 228 is deactivated and this connection serves to connect the data signals on lead 130 to a high cut filter 256 for output between the "time break" and "phone" output leads 258 and 132 of the group 42. The high cut filter 256 may be a commercially available type and is selected to provide a pass band wtihin the zero to 3,000 cycles per second range so that the time break signal information and voice transmitted information may be conducted. Referring again to relay 228, the activated position of movable contact 252 connects the input lead 130 to a lead 260 which connects to a photoconductive element 262 and, in series, to a very low value resistor 264 which is tied to the other input lead 132. Thus, an output can be taken from across resistor 264 via leads 266 and 268 to the uphole terminal. The lamp 248 is positioned physically close to photoconductive element 262 so that the pair constitutes a transient muting device. That is, upon intial actuation of relay 228 the photoconductive element 262 is at a high resistance and it tends to mute any spurious or transient voltages which may be present from the uphole circuitry.

The shot adapter 22 ( FIG. 1) is shown in schematic form in FIG. 4 with each of the control sensing circuits 56, signal transfer circuits 58, and delay relays 62 being shown in dashed outline. The shot adapter 22 receives input via the pair conductor 20 which is connected to the selected two-wire pair in the geophone cable 10. Each lead of pair 20 is connected to a respective one of input leads 280 and 282 and these are applied in parallel to each of the control sensing circuitry 56 and the signal transfer circuits 58 to provide interacting function as will be further described below.

First, leads 280 and 282 are applied to the input winding 284 of a transformer 286, a capacitor 288 being connected in series and serving to tune the input roughly to accept frequencies near that of the output of control generator 38 (FIGS. 2 and 3) while blocking D-C response. A center tapped secondary 290 is connected through oppositely poled diodes 292 and 294 to provide a rectified D-C output at junction 296. The center tap of secondary winding 290 is connected to a negative voltage supply lead 298 and a resistor 300 is connected between negative supply lead 298 and output junction 296.

An additional alternating voltage output is taken from secondary winding 290 from a junction 302 for application to a band pass filter 304 for input to the base of a PNP-type transistor 306. The filter 304 is a commercially available type of L-C filter which is selected to be responsive to a band of frequencies including those of the control signal from generator 38 (FIGS. 2 and 3). The band pass filter 304 is also connected to a positive voltage supply lead 308, from the adapter power supply as will be described.

The collector of transistor 306 is connected directly to the positive supply lead 308 while the emitter is connected through a load resistor 310 to the positive lead 298. The output from transistor 306 is taken from its emitter through a capacitor 312 and it is clamped by a clamping diode 314 connected to negative lead 298. The clamped output is then conducted through a diode 316 to an input terminal 318 of the delay relay circuits 62.

The input junction 318 of delay relay 62 is connected to a smoothing capacitor 320 as well as in paralled connection to each of time delay inputs 322 and 324 to the bases of respective NPN-type transistors 326 and 328. Time delay 322 consists of a series resistor 330 and a capacitor 332 connected to the negative supply lead 298, and time delay 324 is of markedly longer duration and consists of a series resistor 334 and a timing capacitor 336, also connected to the negative supply lead 298. The timing component values are selected so that the timing circuit 322 is appreciably shorter than timing circuit 324; for example, some exemplary component values are: resistors 330, 5.6K; capacitor 332, 3.3 microfarads; resistor 334, 10K and capacitor 6, 100 microfarads.

The transistor 326 has its emitter connected directly to the negative supply lead 298 while its collector is connected through a relay 338 to the positive supply lead 308. A diode 340 is connected across relay 338 to provide transient suppression and a similar protective diode 342 is connected across the collector and emitter elements of transistor 326. In similar manner, transistor 328 has its emitter tied to the negative supply lead 298 and its collector connected through a relay 344 to the positive supply lead 308. The similarly paralleled diodes 343 and 345 provide protective conduction in a manner similar to that previously stated for transistor 326.

The relays 338 and 344 control the "remote firing" and serve to enable the signal transfer circuits as will be further described. A first movable contact 346 provides conduction between a "remote firing" lead 348 (one of pair 64) and a lead 350 which connects to the first movable element 352 of relay 344. When deactivated as shown, the movable element 352 is on an open contact, but activation of relay 338 opens the movable element 346 and subsequent activation of relay 344 connects lead 350 to the remaining "remote firing" lead 354. A second movable element 356 of relay 338 connects the D-C output junction 296, from control sensing transformer 286, to the lead 76 which leads to the signal transfer circuits 58 and provides a gating function which will be further described below. The second movable contact 358 of relay 344, when the relay 344 is deactivated, connects the positive supply lead 308 to a lead 360 which is connected to illuminate a lamp 362 to indicate the "Ready" condition of the shot adapter unit 22. When activated, the movable element 358 grounds the positive supply lead 308, this connection functioning to enable circuitry within the signal transfer circuits 58 as will be further described below.

Power for the shot adapter 22 is supplied by the D-C source 362 and series connected main power switch 364 which are connected across negative supply lead 298 and positive supply lead 308. A large value of capacitance 366 is also connected between supply leads 298 and 308 as is a lamp 368 which serves to indicate the "Power On" condition of the equipment.

The signal transfer circuits 58 consist largely of an SCR 370 and a relay 372 which function integrally as will be described. The SCR 370 has its gate energized via lead 76 which, in turn, is energized through movable contact 356 of deactivated relay 338 (in delay relay circuits 62) to conduct a detected D-C control voltage present at junction 296. The cathode of SCR 370 is connected to the negative supply lead 298 and its anode is connected in series to conduct through a relay 372, as bypassed by suppressor diode 374, for return to ground via lead 376. This use of the ground connection provides an enabling conduction in response to grounding of the positive supply lead 308 by movable contact 358 when relay 344 (delay relays 62) is activated. The gate voltage lead 76 to SCR 370 has a resistor 378 and a capacitor 380 connected between it and the negative supply lead 290 to provide protection against spurious activation by transient voltages.

The output from the uphole geophone 72 (FIG. 2) is conducted via leads 382 and 384 or wire pair 74 for input to the primary of the transformer 386. The output from the secondary of transformer 386 is applied between lead 280, which is connected directly to one of the wires of the connecting pair 20, and a lead 388, leading to normally open contact 390 of relay 372. Lead 388 is also connected through a resistor 392 to the movable contact 394 of relay 372, as well as to lead 282 which connects to the remaining one of the connective wire pair 20. The remaining normally closed contact 396 of relay 372 is connected via a lead 398 through a high-cut filter 400 to an input 402 which, paired with an extension of lead 280, receives an input from the "Time Break and Phone" circuitry. The high-cut filter 400 is a commercially available type similar to the filter 256 of FIG. 3 which allows passage of the time break and voice communication information.

Thus, when relay 372 is deactivated, SCR 370 nonconducting, the time break information on lead 398 (from filter 400) is conducted through movable contact 394 for output on lead 282 paired with the common lead 280 to the connecting wire pair 20 which leads to the selected wire pair 36 of geophone cable 10 (FIG. 2). And, when relay 372 is activated, resistor 392 is bypassed such that uphole signal, from lead 388 on contact 390, is conducted through movable contact 394 for output on lead 282 and common lead 280 to connecting wire pair 20.

The second movable contact 404 of relay 372 is connected to a capacitor 406 which is tied to the negative supply lead 298 such that capacitor 406 is charged through a resistance 408 to positive supply lead 308 when relay 372 is deactivated, and it is discharged through connection 410 and lead 376 to ground when relay 372 is activated. The capacitor 406 effectively provides holding current for relay 372, and a diode 412 is connected between ground lead 376 and positive supply lead 308 to provide arc suppression with respect to actuation of movable contacts 404 of relay 372.

OPERATION

In the operation of the invention it may be assumed that a dynamite-type of prospecting system is employed and that the geophone cable 10 having a plurality of geophones or detectors 30 see FIG. 1) is spread out over a proposed shooting site. The field van 18 is then positioned at an optimum location and recorder adaptor 14 is electrically connected between the recording equipment of field van 18 and a selected cable connector 31 on geophone cable 10. Similarly, blaster van 26 is positioned at a remote location adjacent a selected drill hole or detonation site 34 and the shot adapter 22 is connected between blaster van 26 and a selected connector 31 in the immediate vicinity of the blasting operations.

Closing of the main power switches 182 and 364 energize the respective recorder adapter 14 and shot adapter 22 to a standby condition. In this condition, the unijunction transistor 80 (FIG. 3) undergoes relaxation oscillation and a push-pull output from transistor 114 is present on leads 130 and 132 as a constant frequency control signal output. The frequency of the output may be any frequency within a wide range of selection; however, presently constructed units provide a control signal output at or about eight kilocycles and this has proven to give good operation. Thus, the constant frequency output on leads 130 and 132 is conducted through the connecting lead pair 12 and an associated two-wire pair in the geophone cable 10 (FIG. 2). Also, the leads 130 and 132 apply the control signal to a primary 188 of transformer 190 in the signal transfer circuits 40. An A-C output from terminal 202 is applied to bring about conduction in transistors 206 and 210 such that the "Ready" lamp 218 is lit and the operator is properly apprised of the equipment condition.

Referring to FIG. 4, the shot adapter 22 receives the constant frequency control signal on connecting wire pair 20 and leads 280 and 282 to the input transformer 286. An A-C voltage at junction 302 is selectively passed through the filter-connected band-pass transformer 304 to bring about conduction of transistor 306. A positive going input signal is then present at junction 318 for conduction to the respective time delayed transistors 326 and 328. Thus, the energizing voltage at junction 318 is applied to a first resistor 330-capacitance 332 timing network of short duration after the lapse of which the transistor 326 is caused to conduct thereby to activate the relay 338. Upon activation, the movable contact 346 opens the "remote fire" connection between the remote firing lead 348 and lead 350, and the movable contact 356 opens the lead 76 to the gate electrode of SCR 370 in signal transfer circuit 58.

After an additional time lapse, the signal at junction 318 will have charged timing capacitor 336 to a sufficient level to cause conduction of transistor 328 and, in turn, the activation of relay 344. This activation places movable relay contact 352, in the remote firing circuit, in shorted contact between intermediate firing lead 350 and the "remote fire" input lead 354. In response to the same activation of relay 344, the movable contact 358 removes a short circuit from lead 360 to positive supply lead 308 and connects lead 360 to the negative supply lead 298 through a resistance 361 causing the "Ready" lamp to light. At the same time, the movable contact 358 shorts the positive supply lead 308 to ground and this serves to enable the SCR 370 since its anode circuit is also grounded via lead 376.

The equipment is then in an energized, standby condition with "Ready" lamps 362 and 218 illuminated and giving proper indication at both the shot adapter 22 and the recorder adapter 14. Initiation of the seismic energy generation may then be effected by suitable recorder synchronized apparatus of conventional type as contained in the control 46 (FIG. 2) contained within the field van and attendant equipment. Thus, referring to FIG. 3, a firing input in the form of a switch closure on lead pair 48 (leads 134 and 136) effectively applies the positive supply voltage on lead 138 to the resistance 140 in the input circuit to transistor 148. The applied voltage charges up the capacitor 144 until it becomes sufficiently positive to cause conduction of transistor 148 whereupon the relay 152 is activated and movable contacts 158 and 160 are moved to their other or normally-open positions.

Movable contact 158 breaks the connection applying positive voltage via lead 162 to positive supply lead 84 for the control generator 38. Thus, the oscillation and control generator output are stopped. At the same time, the positive voltage on lead 162 is applied to terminal 164 to charge up a capacitor 168 and this charging voltage, apparent on lead 54, is applied through relay 234 to the negative supply lead 86. The activation of relay 234 closes moving contact 238 to place positive supply voltage from lead 138 via lead 240 to junction 230 to enable the SCR 224. Also upon activation of relay 152, the movable contact 160 which was previously applying positive charging voltage through resistor 174 to charge up capacitor 176, is switched to discharge capacitor 176 through lead 178 to the input circuit of transistor 148. This input extends the conduction period of transistor 148 for a considerable period of time within which all control functions may take place.

In brief, closure of the "remote fire" input pair 48 causes control generator 38 to cease its constant frequency output and, at the same time, the actuator 50 provides outputs to condition the signal transfer circuits 40 for proper acceptance of received seismic data signals as will be further described.

Referring now to FIG. 4, when the constant frequency control signal is no longer received on connecting wire pair 20 and input leads 280 and 282, no A-C output is present at junction 302 of input transformer 286 such that transistor 306 falls out of conduction and removes the positive energizing signal previously present at terminal 318. This, in turn, causes discharge of timing capacitors 332 and 336 through their respective timing resistors 330 and 334. The timing capacitor 332, being of smaller capacitance, is first to fall below the conductance level such that transistor 326 ceases conduction and allows relay 338 to deactivate.

Upon deactivation, the movable contact 346 falls to its normally closed position such that a complete circuit is made through lead 348, lead 350, and lead 354 (relay 344 remaining energized, such that the "remote fire" signal is executed and initiation of the seismic generation takes place). The movable relay contact 356 is also replaced in its normally closed position such that a gating circuit is completed from the D-C output junction 296 of transformer 286 (control sensing circuit 56) through lead 76 to the gate electrode of SCR 370. The remaining delay-driven transistor 328 may then be allowed to drop out of conduction at some time after the seismic energy generation. Thus, movable relay contacts 352 and 358 would relax to their normally closed positions, as shown in FIG. 4.

The "time break" signal, generated upon seismic initiation and indicating absolute zero time, is present across input leads 402 and 280 (lead pair 70) and lead 280 connects directly to one lead of the connecting pair 20 while lead 402 is connected through high-cut filter 400 and lead 398 to the normally closed connection of movable relay contact 394 for conduction via lead 282 through the other lead of the connecting pair 20. The time break signal is then conducted through the selected pair of geophone cable 10 (FIG. 2) and through connecting pair 12 to the recorder adapter 14 whereupon it is conducted on common lead 132 and lead 130 through the normally closed position of relay contact 252 and high-cut filter 256 for output on lead 258 to the "time break" recording channel in the recorder 44 (FIG. 2).

This time break information is conducted for recording and, at the same time, is employed to actuate the signal transfer circuits so that they bring about a signal path shift at a selected time whereby "time break" signal generation is discontinued and "up hole" signal output is conducted on to the recorder 44. In most dynamite or one-shot seismic generation setups, the "up hole" geophone detection of the first seismic energy will usually be about three to five milli-seconds after the first break signal; therefore, a suitable time delay is placed in the system to allow the desire time differentiation in switching the signal transfer circuits 40 and 58.

The "time break" signal, as it was conducted on the output connective pair 20 (FIG. 4), was also applied on leads 280 and 282 to input transformer 286. This input generates a voltage at D-C junction 296 which is applied via movable relay contact 356 and lead 76 to gate on the SCR 370. However, a capacitor 380 of preselected value serves to effect a delay as per its charge rate so that the SCR 370 does not fire until about three milli-seconds after the time break signal generation. When the SCR 370 does fire it activates relay 372 such that movable relay contact 394 is placed in its normally open position on contact 390. The up hole information on lead pair 74, leads 382 and 384 as applied through transformer 386, is then applied on common lead 280 to conductive pair 20 and on lead 388 to relay contact 390 and movable contact 394 for output on lead 282 and the remaining one of the two-wire connecting wire pair 20. The simultaneous closure of movable relay contact 404 applies a charged capacitor 406 to the anode circuit of SCR 370 to continue its conduction for a short duration in a more or less holding fashion.

Meanwhile, in referring to FIG. 3, the signal transfer circuit 40 must also be switched to differentiate between "time break" and "up hole" signal reception. Thus, the "time break" input on connecting two-wire pair 12 is applied via leads 130 and 132 to the transformer 190 and this provides a D-C output from junction 200 on lead 222 to the gate electrode of SCR 224. After a short charging duration of several milli-seconds the capacitor 226 attains the proper chanrge and fires the SCR 224 such that relay 228 is activated. This activation reverses the movable relay contact 252 such that the "up hole" signal on leads 130 and 132 is conducted via lead 260 and developed across the resistor 264 for output between leads 266 and 268 to the recorder 44 (FIG. 2). The movable relay contact 244, when activated, places full negative potential from negative supply lead 86 through lead 246 and the muting lamp 248 to positive supply lead 138 such that the lamp is brightened to reduce the current limiting resistance of photoconductive element 262 during "up hole" signal reception.

Voice communication, either modulated or sound powered, may be carried out at any time when the equipments, recorder adapter 14 and shot adapter 22, are energized to their "Ready" positions since the normal positions of the associated relays will permit straight through conduction.

The foregoing discloses a novel system which utilizes a spare pair of wires in the standard geophone cable for the purpose of communication, remote initiation of seismic energy generation, and transmission of the time break and up hole data signals. The transmission is effected without cross-feed into adjacent ones of the multiple geophone channels and in a manner whereby there is no interference between operation functions. Further, the apparatus enables the transmission of the actual time break and actual up hole signals through independent inputs and outputs so that no time discrepancies will arise due to transducer reaction, signal processing or such.

Changes may be made in the combination and arrangement of elements as heretofore set forth in the specification and shown in the drawing; it being understood that changes may be made in the embodiments disclosed without departing from the spirit and scope of the invention as defined in the following claims.

What is claimed is:

1. In a seismic prospecting system which includes a seismic signal source, uphole detector, time break detector, a multiple two-wire pair geophone cable and plural geophones, and field recording equipment, the improvement comprising:
    a selected one of said multiple two-wire pairs;
    control generator means connected to said two-wire pair to provide a first control signal output;
    control sensing means having its input connected to said two-wire pair and generating a second control signal in response to input of said first control signal;
    means receiving said second control signal for energizing said seismic signal source upon ceasing of said control signal input; and
    means for applying outputs from said time break and uphole detectors to said selected two-wire pair.

2. A system as set forth in claim 1 wherein said control generator means, comprises:
    oscillator means located proximate said field recording equipment and providing a constant frequency output signal for connection to said two-wire pair.

3. A system as set forth in claim 1 wherein said means receiving said second control signal comprises:
    relay means activated by said second control signal; and
    contact means controlled by said relay means which are normally closed and connected to energize said seismic signal source.

4. A system as set forth in claim 1 wherein said means for applying outputs comprises:
    switching means receiving the first input from said time break detector and a second input from said uphole detector and applying a selected output to said selected two-wire pair, the normal output position conducting said first input; and
    said control sensing means having its input connected to said two-wire pair and generating a third control signal in response to input of said time-break signal to actuate said switching means and connect said second input to said output.

5. A system as set forth in claim 4 wherein said means receiving, comprises:
    relay means activated by said second control signal; and
    contact means controlled by said relay means which are normally closed and connected to energize said seismic signal source.

6. A system as set forth in claim 1 which is further characterized to include:
    relay switching means located proximate said field recording equipment to receive input from said selected two-wire pair and to provide a first output in its normal position to said field recording equipment and to provide a second output in said actuated position to said field recording equipment; and
    means receiving output from said time break detector via said selected two-wire pair to actuate said relay means to its second position.

7. A system as set forth in claim 4 which is further characterized to include:
    relay switching means located proximate said field recording equipment to receive input from said selected two-pair and to provide a first output in its normal position to said field recording equipment and to provide a second output in said actuated position to said field recording equipment; and
    means receiving output from said time break detector via said selected two-wire pair to actuate said relay means to its second position.

8. A device for interconnecting and coordinating seismic energy generation and seismic energy detection and recording in a geophysical prospecting system, comprising:
    a geophone cable having plural wire pairs for conducting detected seismic energy indications and a selected wire pair for conducting control data;
    transmitter means generating a constant frequency control signal for conduction on said selected wire pair;
    relay means connected to said selected wire pair to receive said control signal for energization such that seismic energy generation is not initiated;
    means for stopping said control signal generation to deenergize said relay means such that seismic energy generation is effected.

9. A device as set forth in claim 8 which is further characterized to include:
    first means providing a time break signal upon said seismic energy generation;
    means connecting said time break signs input to said selected wire pair; and
    recording means receiving said time break signal from said selected wire pair.

10. A device as set forth in claim 9 which is further characterized to include:
    detector means generating an up-hole seismic signal output;
    first means actuated by said time break signal to disconnect said time break signal input from said selected wire pair while connecting said detector means output thereto; and
    second means actuated by said time break signal to disconnect said time break signal from said recording means and to connect said uphole signal thereto.

11. A device as set forth in claim 9 in which is further characterized to include:
    voice communication means connected in parallel with said time break signal input means and said time break signal recording means.

12. A seismic prospecting system comprising:
    a seismic energy source;
    a cable including a plurality of wire pairs;
    plural geophones each connected to one of said wire pairs;
    means proximate the source end which includes a detonator for said seismic energy source, an up-hole detector, a time break detector, and voice communication phones;
    first adapter means connected between said means proximate the source end and one selected wire pair of said cable to conduct a remote firing signal, uphole data, time break data, and voice communications;
    control means which includes recording means for receiving the output from each of said plural geophones to record the respective outputs, and for receiving outputs from said up-hole geophone, time break detector, and voice communication phones;
    second adapter means connected between said control means and said selected wire pair of said cable to conduct said remote firing signal, up-hole data, time break data, and voice communication.

13. A system as set forth in claim 12 wherein said first adapter means comprises:
   switch means having a common output connected to said selected wire pair and having first and second inputs connected to said time break and up-hole detectors respectively;
   detector means connected to said selected wire pair to receive a control signal input and generate a second control signal output;
   means for preventing the seismic energy source detonation upon receiving said second control signal at the input.

14. A system as set forth in claim 13 wherein said second adapter means comprises:
   switch means having a common input connected to said selected wire pair and having first and second outputs connected to recording means for said time break and up-hole data, respectively;
   means for generating a control signal for conduction on said selected wire pair; and
   means for disabling said means for generating such that the control signal is removed from the selected wire pair and said detector means generates no second control signal to disable said means for preventing said source detonation.

References Cited

UNITED STATES PATENTS

| | | | |
|---|---|---|---|
| 3,316,996 | 5/1967 | Ball et al. | 181—.5 |
| 3,342,283 | 9/1967 | Pound | 181—.5 |

BENJAMIN A. BORCHELT, *Primary Examiner.*

T. H. WEBB, *Assistant Examiner.*